(12) United States Patent
Harris et al.

(10) Patent No.: US 11,423,453 B1
(45) Date of Patent: *Aug. 23, 2022

(54) GENERATING REPORTS WITH RECOMMENDATIONS FOR ENABLING SUPPLIER CATALOGS BASED ON PROCUREMENT DATA FROM BUYER COMMUNITY

(71) Applicant: Coupa Software Inc., San Mateo, CA (US)

(72) Inventors: Scott Harris, Menlo Park, CA (US); Ahmad Sadeddin, San Francisco, CA (US); Snigdha Dharmavaram, San Jose, CA (US)

(73) Assignee: COUPA SOFTWARE INC., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/226,968

(22) Filed: Apr. 9, 2021

Related U.S. Application Data

(63) Continuation of application No. 16/510,978, filed on Jul. 15, 2019, now Pat. No. 10,997,641.

(51) Int. Cl.
*G06Q 30/06* (2012.01)
*G06F 16/953* (2019.01)
*G06Q 30/02* (2012.01)

(52) U.S. Cl.
CPC ....... *G06Q 30/0603* (2013.01); *G06F 16/953* (2019.01); *G06Q 30/0201* (2013.01)

(58) Field of Classification Search
CPC ............ G06Q 10/00–50/00; G06F 1/00–40/00
USPC .................................................. 705/7.11–7.42
See application file for complete search history.

(56) References Cited

U.S. PATENT DOCUMENTS

| | | | | |
|---|---|---|---|---|
| 6,411,950 B1* | 6/2002 | Moricz | ............... | G06F 16/2428 707/999.005 |
| 7,627,548 B2* | 12/2009 | Riley | .................. | G06F 16/3338 |
| 8,370,203 B2* | 2/2013 | Dicker | ............... | G06Q 30/0603 705/26.7 |
| 8,639,679 B1* | 1/2014 | Zhou | .................. | G06F 16/90324 707/706 |
| 8,904,471 B1* | 12/2014 | Eisner | .................. | G06Q 10/087 726/4 |

(Continued)

*Primary Examiner* — Alan S Miller
(74) *Attorney, Agent, or Firm* — Baker Botts, L.L.P.

(57) ABSTRACT

A computer implemented method maintaining a database including records of one or more supplier system catalogs enabled by multiple buyer systems. The method includes tracking, by the processor, query expressions and corresponding query results generated from the database by a specific buyer system, the query results identifying matches between the query expressions and a set of records of supplier system catalogs enabled and integrated for procurement with the specific buyer system. The method further includes determining, from the query expressions and corresponding query results, the query expressions that satisfy criteria for low match rates and identifying additional matches between the query expressions and at least one unassociated supplier system catalog outside of the set of enabled and integrated supplier system catalogs, the identifying based upon an analysis of community buyer system data. A report is generated based upon the additional matches and transmitted to the specific buyer system.

20 Claims, 14 Drawing Sheets

(56) References Cited

U.S. PATENT DOCUMENTS

| | | | | |
|---|---|---|---|---|
| 8,954,422 | B2* | 2/2015 | Hasan | G06Q 30/0625 707/E17.084 |
| 8,965,872 | B2* | 2/2015 | Hsu | G06F 16/3329 707/765 |
| 8,983,996 | B2* | 3/2015 | Lai | G06F 16/9032 707/767 |
| 10,339,135 | B2* | 7/2019 | Duan | G06F 16/2425 |
| 10,643,178 | B1* | 5/2020 | Kitson | H04L 67/02 |
| 10,776,796 | B2* | 9/2020 | Amarthaluri | G06Q 30/0201 |
| 2002/0147656 | A1* | 10/2002 | Tam | G06Q 30/0613 705/26.81 |
| 2003/0061121 | A1* | 3/2003 | Ouchi | G06Q 30/06 705/26.61 |
| 2003/0204467 | A1* | 10/2003 | Kartha | G06Q 50/188 705/37 |
| 2008/0221983 | A1* | 9/2008 | Ausiannik | G06Q 30/0277 705/14.54 |
| 2008/0235148 | A1* | 9/2008 | Liu | G06Q 30/00 707/999.005 |
| 2009/0094227 | A1* | 4/2009 | Berkowitz | G06F 16/3322 707/999.005 |
| 2010/0299203 | A1* | 11/2010 | Westphal | G06Q 30/02 705/14.49 |
| 2011/0276435 | A1* | 11/2011 | Arya | G06Q 30/0641 705/27.1 |
| 2012/0036123 | A1* | 2/2012 | Hasan | G06F 16/95 707/E17.084 |
| 2012/0185507 | A1* | 7/2012 | Paparizos | G06F 16/243 707/774 |
| 2012/0265787 | A1* | 10/2012 | Hsu | G06F 16/36 707/E17.014 |
| 2017/0132275 | A1* | 5/2017 | Duan | G06N 7/005 |
| 2018/0341955 | A1* | 11/2018 | Amarthaluri | G06Q 30/0201 |

* cited by examiner

… (1)

GENERATING REPORTS WITH RECOMMENDATIONS FOR ENABLING SUPPLIER CATALOGS BASED ON PROCUREMENT DATA FROM BUYER COMMUNITY

BENEFIT CLAIM

This application claims the benefit under 35 U.S.C. § 120 as a continuation of application Ser. No. 16/510,978, filed 15 Jul. 2019, the entire contents of which are hereby incorporated by reference for all purposes as if fully set forth herein.

TECHNICAL FIELD

Aspects of the disclosure relate generally to updating search results and methods of displaying them. More specifically, aspects of the disclosure relate to techniques for improving catalog search results within a database management system for buyer and supplier systems.

BACKGROUND OF DISCLOSURE

Many businesses wish to enhance their search and procurement of supplies and services to their employees using server-based E-procurement or spend management systems connecting buyers with supplier systems. Multiple users of a multiple buyer systems might utilize an E-procurement system to search and select from catalogs of products and services from multiple supplier systems. For example, buyer systems can choose to enable and integrate multiple catalogs from supplier systems through an E-procurement system.

However, catalogued products and services enabled with buyer's spend management system may not match the buyer systems with the most accurate or complete sets of supplier catalogs and items therein, such as with frequently searched and needed items that go unprocured from the enabled catalogs or are procured from mismatched or non-integrated seller systems. Many software systems don't provide a readily available way of addressing such deficiencies, potentially causing a significant delay and/or added costs to the buyer systems in an E-procurement system and spend management process.

It would be useful to have a spend management system that can collect information associated with searching and procurement of products from the catalogs from buyer systems, utilize important community intelligence among buyer and seller systems, and thereby enhance the process of procurement for both buyer systems and supplier systems.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Example Computing Environments and Computer Components

Figure 1:
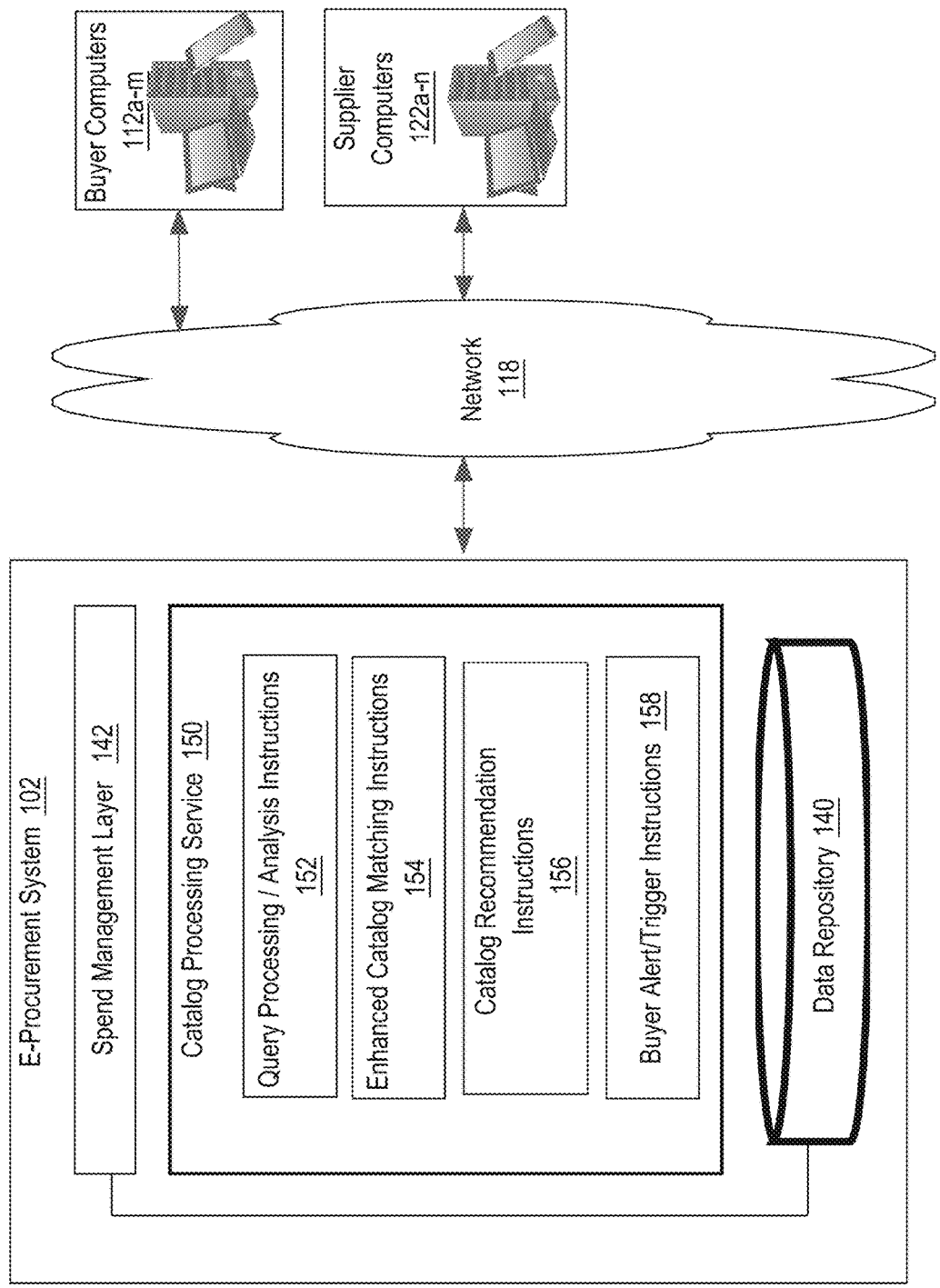
FIG. 1 illustrates an example networked computer system with which various embodiments may be practiced.

FIG. 1 illustrates an example networked computer system with which various embodiments may be practiced. FIG. 1 is shown in simplified, schematic format for purposes of illustrating an example and other embodiments may include more, fewer, or different elements.

In some embodiments, the networked computer system comprises an E-procurement system 102. In some embodiments, the system 102 broadly represents one or more computers, such as a server/data farm, a cloud computing platform, or a parallel/distributed computer system, virtual computing instances, and/or instances of a server-based application. The system 102 comprises a spend management layer 142 that is programmed or configured to host or execute functions including but not limited to managing buyer accounts associated with the one or more buyer computers 112*a-m* and supplier accounts associated with the one or more supplier computers 122*a-n*, conducting procurement transactions, and facilitating generation and maintenance of digital documents during procurement transactions between buyer accounts and supplier accounts, such as catalogs, purchase requisitions, purchase orders, or invoices.

The data associated with the procurement functions can be stored in a data repository 140 managed by data source computers (e.g., database management server (DBMS) computers).

In some embodiments, each of the buyer computers 112*a-m* broadly represents one or more computers, virtual computing instances, and/or instances of an E-procurement application program that are associated with an institution or entity that is related as a buyer with respect to a separate entity associated with one of the supplier computers 122*a-n*. A buyer computer 112*a* is programmed to create a buyer account with the system 102 and manage digital documents related to a buyer account during procurement transactions, such as receiving a catalog of items for sale through the system 102, generating or transmitting a purchase requisition or purchase order for some of the items for sale through system 102, or receiving an invoice for some of the items for sale through system 102. The buyer computer 112*a* may comprise a desktop computer, laptop computer, tablet computer, smartphone, wearable device, or any other type of computing device that is capable of proper communication with the system 102 as well as adequate local data processing and storage. In some cases, a buyer computer 112*a* may be a personal computer or workstation that hosts or executes a browser and communicates via HTTP and HTML over the network 118 with a server-side E-procurement application hosted or executed at the system 102. In other cases, a buyer computer 112*a* may be a server-class computer and/or virtual computing instance that hosts or executes an instance of an E-procurement application that communicates programmatically via API calls, RPC or other programmatic messaging with the system 102.

Similarly, in some embodiments, each of the supplier computer 122*a-n* broadly represents one or more computers, virtual computing instances, and/or instances of an E-procurement application program that are associated with an institution or entity that is related as a supplier with respect to a separate entity associated with one of the buyer computer 112*a-m*. A supplier computer 122*a* is programmed to create a supplier account with the system 102 and manage digital documents related to a supplier account during procurement transactions, such as generating or transmitting a catalog of items for sale to the system 102, receiving a purchase order for some of the items for sale from the system 102, or generating or transmitting an invoice for some of the items for sale to the system 102. A supplier computer 122*a* may comprise a desktop computer, laptop computer, tablet computer, smartphone, wearable device, or any other type of computing device that is capable of proper communication with the server as well as adequate local data processing and storage. In some cases, a supplier computer 122*a* may be a personal computer or workstation that hosts or executes a browser and communicates via HTTP and HTML over network 118 with a server-side E-procurement application hosted or executed at the system 102. In other cases, a supplier computer 122*a* may be a server-class computer and/or virtual computing instance that hosts or executes an instance of an E-procurement application that communicates programmatically via API calls, RPC or other programmatic messaging with the system 102.

FIG. 1 also illustrates example components of the system 102 in accordance with the disclosed embodiments. Each of the functional components can be implemented as software components, general or specific-purpose hardware components, firmware components, or any combination thereof. A storage component can be implemented using any of relational databases, object databases, flat file systems, or JSON stores. A storage component can be connected to the functional components locally or through the networks using programmatic calls, remote procedure call (RPC) facilities or a messaging bus. A component may or may not be self-contained. Depending upon implementation-specific or other considerations, the components may be centralized or distributed functionally or physically.

In some embodiments, the E-procurement system 102 is programmed for collecting and transmitting transactional data or documents, such as catalogs, purchase requisitions, purchase orders, or invoices, between supplier computers and buyer computers and maintaining the transactional data in memories. Data management instructions can enable managing the transactional data by semantic units, such as individual item descriptions or prices. For example, a catalog retrieved from a supplier computer can be parsed into these semantic units, or a graphical user interface can be presented for entering or selecting such semantic units in generating a purchase requisition. Additional metadata that may not be part of the transactional data can also be stored with the transactional data, such as the date of creation or the list of accounts accessing the transactional data.

In some embodiments, the network 118 may be implemented by any medium or mechanism that provides for the exchange of data between the various elements of FIG. 1. Examples of the network 118 include, without limitation, one or more of a cellular network, communicatively coupled with a data connection to the computing devices over a cellular antenna, a near-field communication (NFC) network, a Local Area Network (LAN), a Wide Area Network (WAN), the Internet, a terrestrial or satellite link, etc.

In some embodiments, the system 102 is programmed to receive or transmit transactional data, such as catalogs, purchase requisitions, purchase orders, or invoices, from or to the buyer computers 112*a-m* or the supplier computers 122*a-n*. In other embodiments, the server 102 is programmed to receive or transmit additional transactional data, such as expense reports, from or to one of the buyer computers 112*a*-112*m* representing an organization and another one of the buyer computers 112*a*-112*m* representing an entity, and similarly from or to one of the supplier computers 122*a*-112*n* representing an organization and another one of the supplier computers 122*a*-122*n* representing an entity. The system 102 is programmed to also store such transactional data in association with the appropriate accounts in a storage device, such as the data repository 140. Such transactional data may include terms of an early payment discount offered by a supplier account to a buyer account. The system 102 is programmed to further receive additional data from the data source computers 132*a-q* that can be used to assess the transactional data communicated between one of the supplier computer 122*a-n* and one of the buyer computers 112*a-m*. The additional data may include industry-wide prices of certain items sold by a supplier account or annual revenue or spending data associated with a buyer account.

In some embodiments, a catalog management service 150 can comprise computer executable instructions, including query processing and analysis instructions 152 for query processing and storing and analyzing the queries and results of the queries, enhanced catalog matching instructions 154 for determining additional matches between query expressions and entries in supplier catalogs, and catalog recommendation instructions 156 for filtering and reporting additional matches/recommendations to buyer system. Further buyer alert and trigger instructions 158 enable automatically determining and reporting additional catalog matches based upon, for example, changes to records of catalogs stored in the data repository 140, events that occur in relation to buyer or supplier systems including exceeding thresholds of unmatched queries, spending limits outside of assigned supplier catalogs, preferences configured by buyer systems, and others such as further described herein.

Example Processing Instructions

Figure 2:
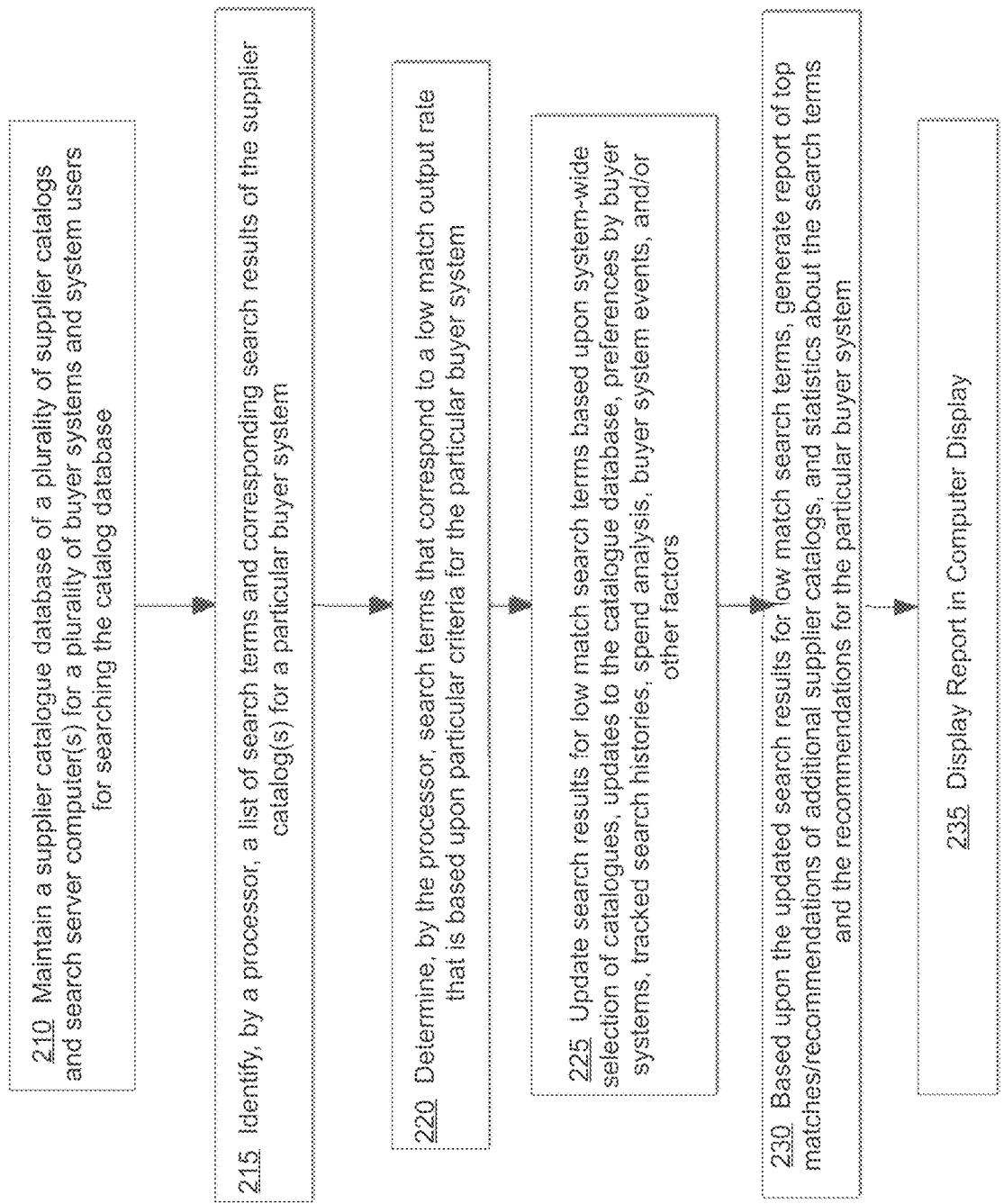
FIG. 2 is an illustrative flow diagram of an updated catalog search process according to various embodiments.

FIG. 2 is an illustrative flow diagram of an updated catalog search process according to various embodiments. At block 210, a supplier catalog database is maintained for an E-procurement system in which supplier systems provide information pertaining to the catalogs through which buyer systems can procure products and services. In embodiments, supplier system catalogs can be enabled/integrated with particular buyer systems so that when buyer systems perform catalog searches across the E-procurement system, the results represent those from catalogs which are integrated/enabled for those particular buyer systems. For example, when a user of a particular buyer system performs a search/query in the E-procurement system to find a particular item for purchase, the E-procurement system is limited to listing items from those catalogs which are approved and enabled/integrated with the particular buyer system. In embodiments, the E-procurement system maintains multiple catalogs across multiple supplier systems and buyer systems.

At block 215, as a particular buyer system performs searches of the set of catalogs associated/enabled/integrated with the particular buyer system for particular items, the E-procurement system tracks these searches and their parameters (e.g., query expressions) and their resulting matches with particular catalogs. Numerous types of criteria can be used for matching queries with catalogs. For example, matches can be based upon the frequency of occurrence of the search terms in the catalogs and/or occurrence of similar or equivalent terms found in the catalogs and/or whether the terms can be associated with categories of items listed in the catalogs.

In embodiments, community data can be used to match queries with particular catalogs. community data can be used to classify the search terms and assign a commodity to each search term. This can be done by comparing the search term to actual spend transactions from other buyer systems and determining how the system classified those search terms and transactions from others. When a search term cannot be particularly classified, for example, community data can be used to improve the classification. In an embodiment, a search term that corresponds with a significant number of community spend transactions and those spend transactions have commodity classifications (e.g., a United Nations Standard Products and Services Code), community intelligence can assign a classification from the spend data to best classify the search term and better improve matches between search terms and items in catalogs. Other methods of searching data repositories known to those of ordinary skill in the art can be used, for example, as described in U.S. patent application Ser. No. 15/972,060 filed on May 4, 2018, the entire contents of which is herein incorporated by reference.

In various embodiments, the queries and results of the queries are tracked for the particular buyer system and stored such as in a computer database or other data repository system. Other events pertaining to the buyer systems may also be tracked including the actual purchase of items and their connection, if any, to item searches and to particular catalogs maintained or external to the E-procurement system. This tracking can be compiled across multiple supplier systems and buyer systems.

At block 220, calculations are performed to classify which query expressions tracked at block 215 have a low match output rate and/or the lowest match output rates within a given time frame. A low match output rate can correspond with query expressions that result in catalog search matches which fall below a certain established threshold (e.g., set by a particular buyer system). The calculations may also determine the top lowest matches, ranking a certain number of query expressions in order of the lowest match output rates. In various embodiments, ranking can be done with thresholds or without thresholds such as based upon buyer system preferences. Other criteria may also be used to classify and/or rank low match rate expressions including the category of search expression or item being searched, for example. In an embodiment, the updated search results are ranked on the basis of what searches could have been covered by a single supplier and/or the amount of catalog spending that can be attributed to a particular supplier covering the searches. In embodiments, coverage of searches can be based upon search related items available within supplier catalogs integrated with the system and can further include search related items purchased outside of integrated catalogs (e.g., requisitions entered manually by a buyer system user).

At block 225, an expanded/enhanced search is performed for catalogs that match with the identified low match output rate query expressions for a particular buyer. In an embodiment, the search may query catalogs in the E-procurement system not enabled/associated/authorized with the particular buyer system. The updated search may match a portion or all of the identified low output query expressions with additional catalogs such as those enabled by other buyer systems. The updated search can also be based upon community intelligence and/or artificial intelligence including, for example, similar queries from other buyer systems that have resulted in purchases of the same or similar products, product reviews and purchase history for seller systems by other buyer systems, news articles about particular supplier systems, and other information. In embodiments, community data is used to present what percent of spend transactions from other buyer systems originated from integrated catalog content so that buyer systems can distinguish what suppliers offer, including integrated catalog modes or other purchasing options that may best meet their needs. In embodiments, details of spend transactions (integrated catalog purchases, manual entry purchases, and invoice content) across a community of buyer systems are used to classify the spend of the potential suppliers that could cover the search term. For example, in an embodiment, if the same item name is purchased by two different buyer systems, but one buyer system has the item classified as a particular commodity —community intelligence can be used to best classify the item based upon the spend data. The buyer and supplier systems now have more complete data on more spend transactions that can be used for correlating searches with catalog items and also updating/matching supplier opportunities with search terms. Based upon the updated search results, a report is generated at block 230. For example, the updated search could rank/recommend search results corresponding to better product reviews and/or more frequent product purchases over other search results.

In an embodiment, the report generated at block 230 is displayed in a graphical user display at block 235 and includes a list of low match query expressions calculated at block 215. In an embodiment, the report identifies additional supplier systems that provide additional catalogs as identified from the updated search at block 225 as recommended opportunities to the particular buyer system. In various embodiments, the recommendations of supplier systems or catalog items may be filtered and/or ranked based upon preferences of the particular buyer system, search and/or purchase histories of the particular buyer system, and/or other factors. For example, a buyer system user may prefer to only see recommendations and/or rank recommendations based upon certain price points, volume discounts, percentage of other low-output queries the catalog is matched with, positive reviews by other buyer systems, level of choice and variety of items offered by the supplier system, sales history with other buyer systems, and/or other factors. In certain embodiments, some or all of a report (or a consolidation of reports across numerous buyer systems) may be transmitted to supplier systems, which can then utilize the reports to target and notify buyer systems with E-procurement opportunities (e.g., catalogs) available through the E-procurement system.

In embodiments, a report can also include various statistics about the identified low match query expressions and/or recommendations. For example, the report can identify the number of matches associated with each of the identified query expressions for one or more buyer systems, or the number of times and frequency in which the query expressions are used by one or more buyer systems within a certain time frame. In an embodiment, a report can indicate the percentage of tracked query expressions which match with a particular recommendation of a supplier system and/or catalog. Other information, including purchase history information associated with the buyer system and products associated with the identified queries can be included in the report. In an embodiment, a buyer system user can select a recommended catalog or supplier system and associate it with the buyer system for future procurement use. Exemplary reports/displays are shown, for example, in FIG. 4 and FIG. 5 as further described below.

Figure 3:
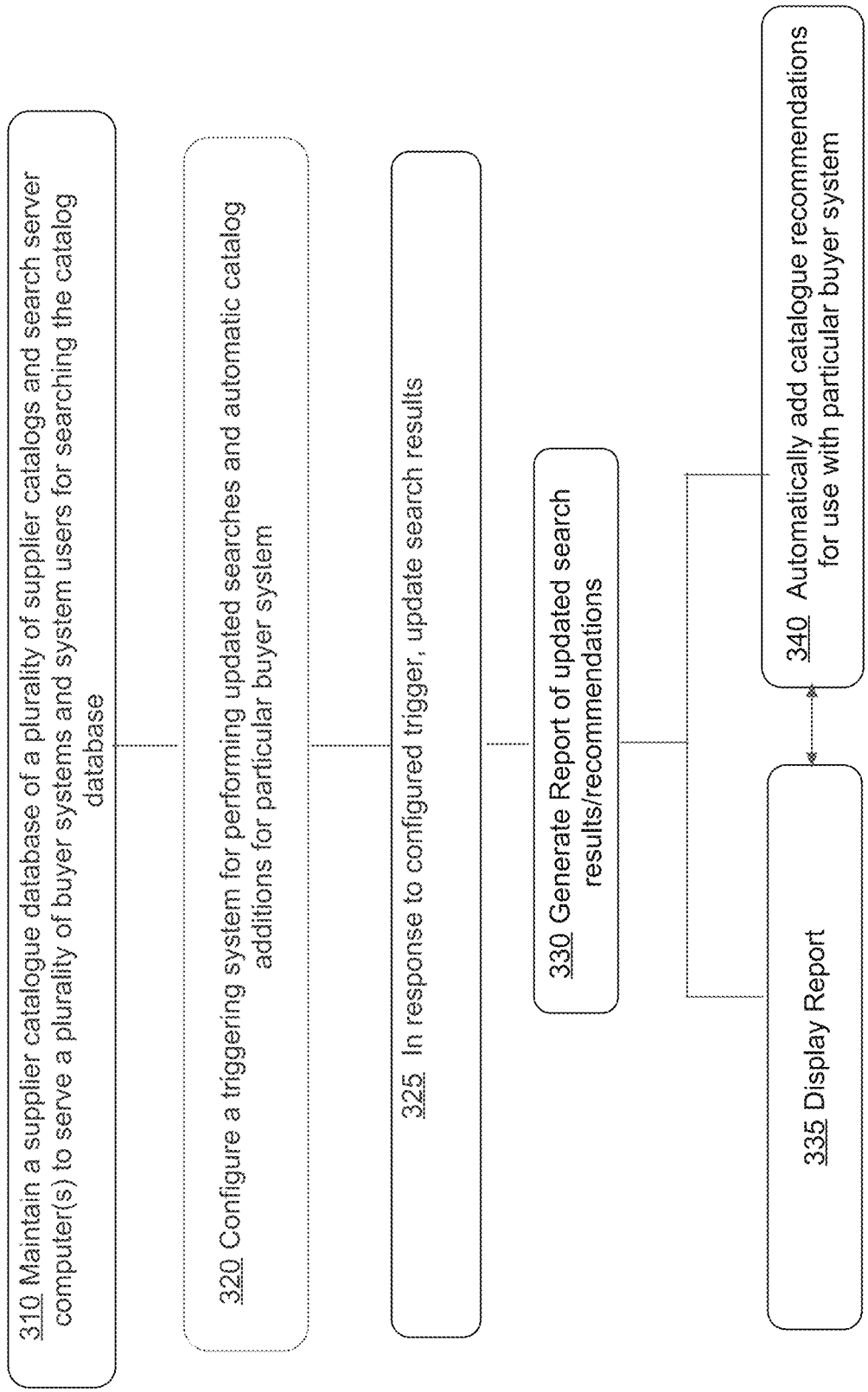
FIG. 3 is an illustrative flow diagram of an updated catalog search process according to various embodiments.
Figure 7:
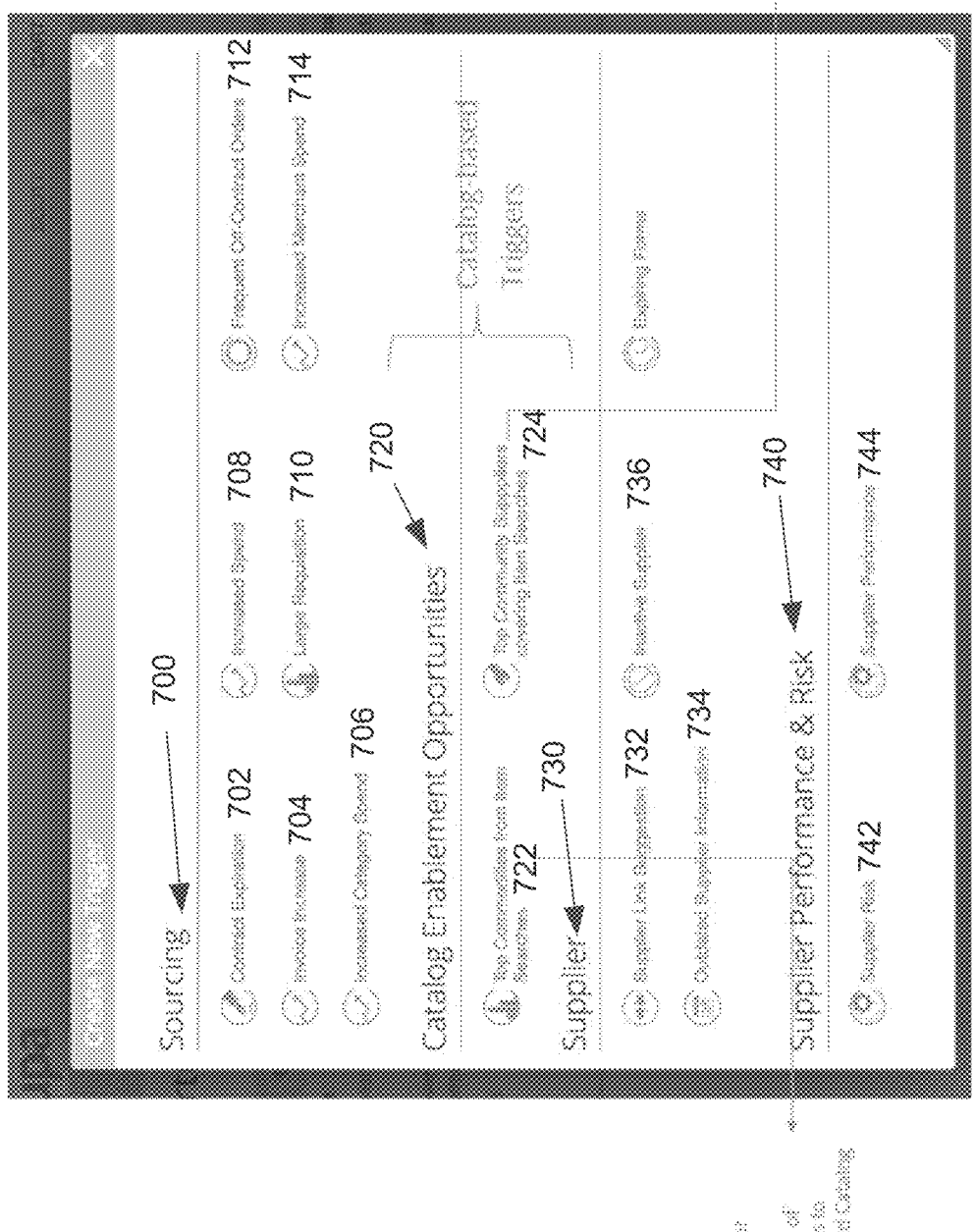
FIG. 7 is an illustrative graphical user interface showing trigger configuration settings for a buyer system for automatic performance of enhanced catalog search and generation of enhanced search reports and/or other system responses according to various embodiments.
Figure 8:
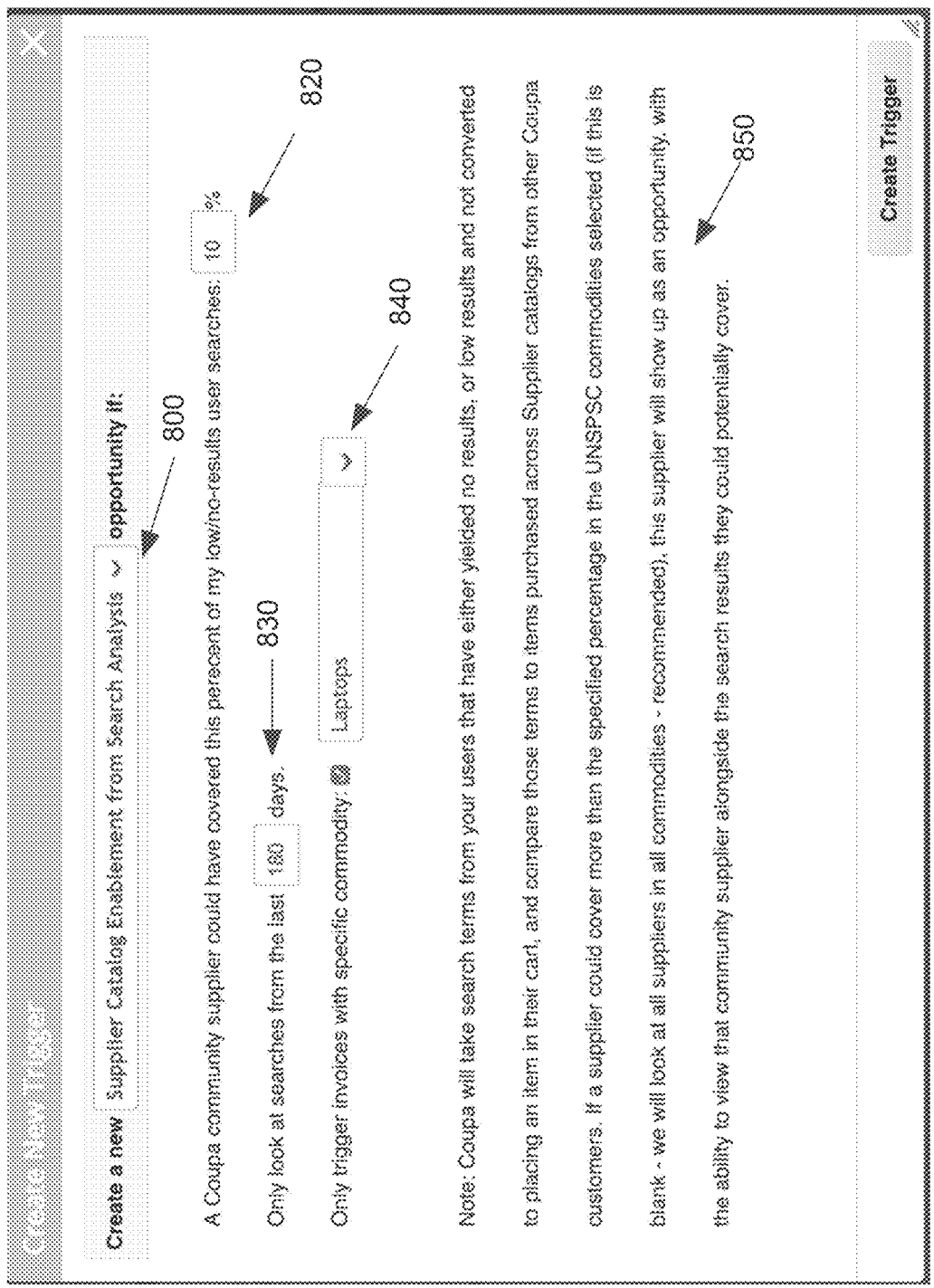
FIG. 8 is an illustrative graphical user interface for configuring triggers for automatic generation of notifications of seller system recommendations according to various embodiments.

FIG. 3 is an illustrative flow diagram of an updated catalog search process according to various embodiments. Such as described above with respect to FIG. 2, a supplier catalog database is maintained for an E-procurement system at block 310. At block 320, a trigger/response system is configured which causes automated generation of search/recommendation reports (e.g., reports as described above) and/or other actions in response to particular events or other trigger mechanisms that can be monitored by the E-procurement system. The E-procurement system can track transactions or other activity conducted within the E-procurement system (e.g., search and purchase activity) and, in response to detecting the triggering event or activity, conduct an updated search, report, or other operation. These triggers can include, for example, updates to supplier catalogs (e.g., the removal or addition of catalogs from the E-procurement system catalog database) or a high occurrence of queries with low or no matches (e.g., based on particular match rate threshold parameters). Other triggers can include buyer or supplier system events such as, for example, a spend level that exceeds a particular threshold, supplier prices that exceed a certain threshold, exceeding a threshold of buyer system purchases that occur outside of catalogs associated with the buyer system, and/or the termination or expiration of an association (e.g., contract) between a buyer system and supplier system. In various embodiments, the E-procurement system may default to particular triggers, thresholds, and/or responsive actions. Exemplary interfaces for configuring a trigger are shown in FIG. 7 and FIG. 8 and further described below.

At block 325, in response to a trigger such as described, an updated search is performed and a new report based upon the updated search is generated at block 330 (e.g., similar to that described above with respect to blocks 225 and 230 of FIG. 2). In an embodiment, the report may be transmitted at block 330 to a particular buyer system and displayed in a graphical user interface at block 335, such as to a buyer system administrator. In an embodiment, based upon user preferences, a catalog recommended from the report may be automatically added/associated at block 340 with a particular buyer system such as for direct use by buyer system users.

Figure 4A:
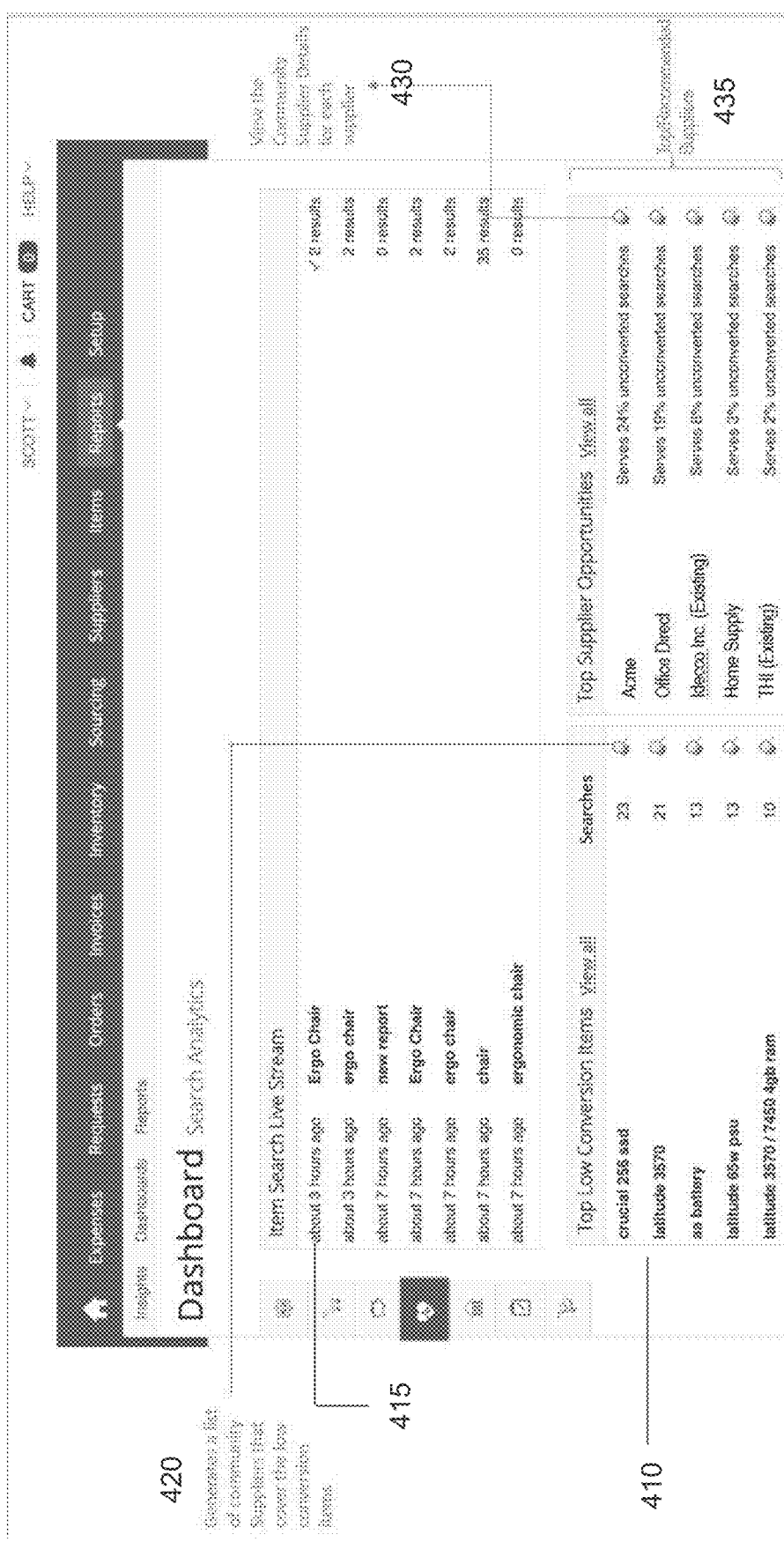
FIG. 4A is an illustrative graphical user interface showing a report of search results and recommended selections of additional search matches according to various embodiments.

FIG. 4A is an illustrative graphical user interface showing a report of search results and recommended enablement of supplier systems or supplier catalogs for a buyer system. A list 410 shows the lowest matching query expressions performed by a particular buyer system along with the number of searches conducted during a certain period of time for each expression. In an embodiment, selecting an input 420 next to a query expression causes displaying a list (not shown) of suppliers/supplier catalogs identified in an expanded/updated search such as described above. A list 440 of top newly identified suppliers associated with the lowest matching query expressions is shown along with the percentage of the lowest query matches that the top suppliers are matched with. The listed supplier recommendations are shown ordered by the percentages of the lowest query matches which would have been identified in recent searches performed by the buyer system had their catalogs been enabled/integrated with the particular buyer system. If a buyer system user clicks on a supplier recommendation at input 430, further details about the supplier system recommendation is displayed (e.g., as a pop-up or new window). In an embodiment, these further details can include performance metrics of the supplier system with respect to other buyer systems and in comparison to other supplier systems. In embodiments, the details about the recommended supplier can include a financial score (e.g., based upon size and spend levels), a judicial score (e.g., based upon buyer feedback), news sentiment (e.g., percentage of news items with positive analysis), screening status (e.g., criminal background check), an overall risk rating based upon one or more of the prior factors, enablement/integration features (including what technologies are supported such as cXML/Accelerate), the number and/or list of countries the supplier system ships to including buyer system locations. In embodiments, what details are displayed to the buyer system can be configured/managed by the buyer system. In an embodiment, certain buyer system user accounts can select (e.g., a button) to enable a recommended supplier system catalog. In an embodiment, live updates at 415 are shown displaying the most recently used query expressions and the number of matches associated with each.

Figure 4B:
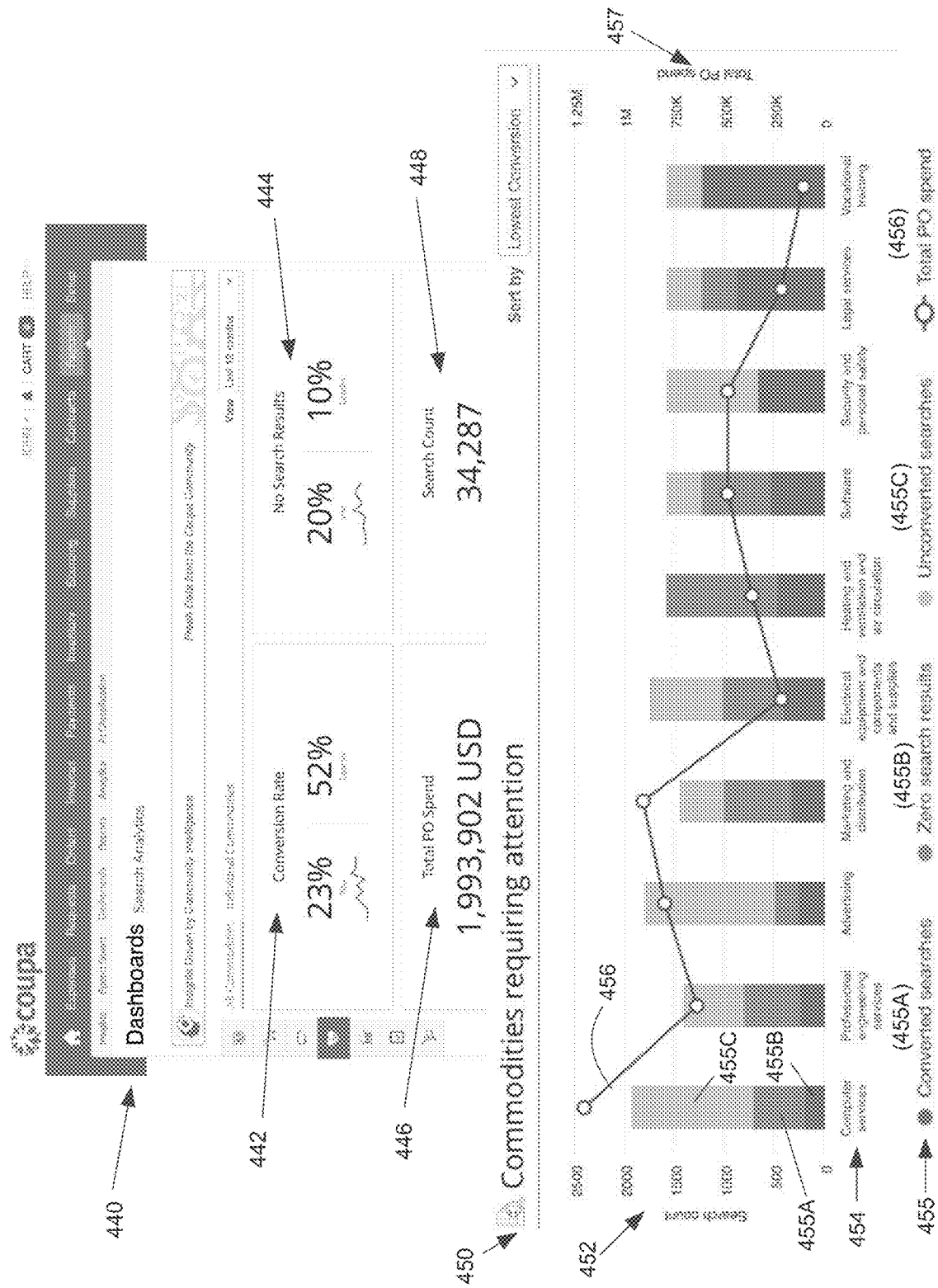
FIG. 4B is an illustrative graphical user interface showing a report of overall search results and a breakdown of search results pertaining to a set of commodities related to a buyer system according to various embodiments. [00.13]

FIG. 4B is an illustrative graphical user interface showing a report of overall search results and a breakdown of search results pertaining to a set of commodities for related to buyer system according to various embodiments. A display 440 provides analytical information pertinent for determining the productivity of a buyer system in fulfilling search and purchase requests and for configuring the buyer system for improved performance such as by enabling additional supplier system catalogs. For all commodities of interest to the buyer system, conversion rate information 442 indicates what percentage of buyer system search results are converted into purchases or even put in a shopping cart by the buyer system and compares this information to a top conversion rate within a buyer system community. As the lack of search hits from enabled supplier catalogs can be a main factor in the lack of conversion from a search request, such information could indicate a need for improvements in search results and/or enablement of additional supplier catalogs for addressing needs related to the unconverted search queries. A total amount of purchase order spending is displayed at 446 along with the total number of searches performed by the buyer system at 448. At 444, information indicating the percentage of buyer system searches having no results is presented. For comparison, the lowest recorded percentage among a buyer system community with no search results is also shown. As noted above, no search result contributes to no conversion into a purchase. The percentage for the buyer system, which is higher than the lowest recorded percentage, indicates an amount of opportunity for the buyer system to learn from the community by enabling additional supplier catalogs.

A chart 450 is configured to break down information about buyer system searches according to the commodities searched and search related activity. Chart 450 identifies search counts (along axis 452) according to search activities or non-activity (identified by legends 455) including converted searches 455A that corresponds to the conversion rate 442 noted above, searches producing no search results 455B that corresponds to the data related to no search result 444 noted above, and searches 455C that did not result in purchases. The search counts are separated into commodities or product categories along axis 454. The listing of commodities can be sorted by the percentage of searches with no conversion, or other aspects. A total spend amount graphic 456 is also displayed for the product categories corresponding to axis 457 in amounts of thousands of dollars. This information can be useful, for example, in determining which categories of searches and/or supplier catalogs may need further configuring by the buyer system in order to improve purchasing efficiency and performance.

Figure 4C:
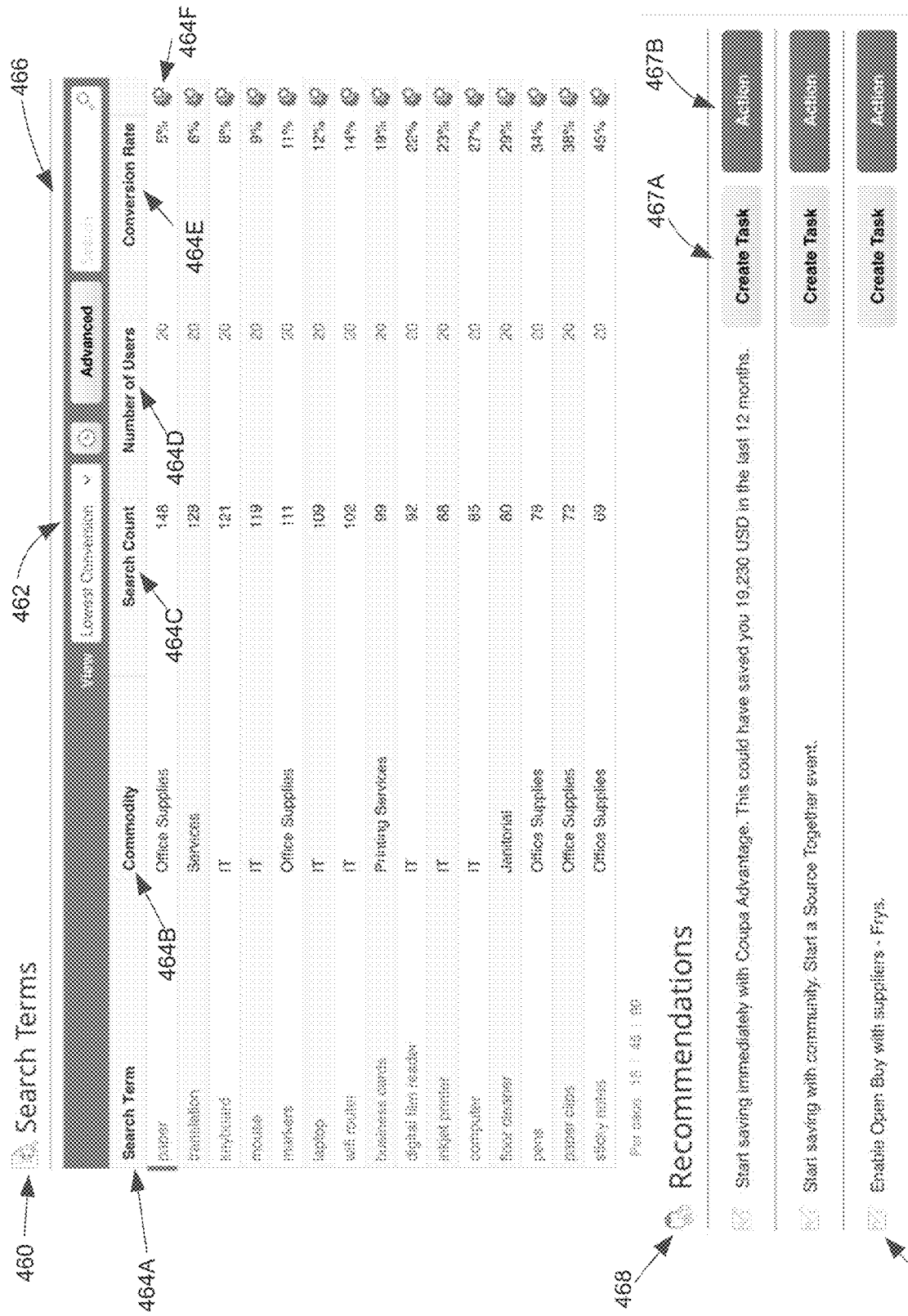
FIG. 4C is an illustrative graphical user interface showing a report of monitored user search terms and associated statistics related to a buyer system according to various embodiments.

FIG. 4C is an illustrative graphical user interface showing a report of monitored user search terms and associated statistics related to a buyer system according to various embodiments. A display 460 lists search terms used by a buyer system in column 464A that can be sorted/ranked according to characteristics selectable at menu 462 including, for example, by lowest purchase conversion rate, most frequently used, product category, and/or others. Along with the search term, corresponding information is listed including commodity of the item described by the search term at column 464B, number of times used, at column 464C, number of users who used the search term, at column 464D, and the conversion rate (rate at which a subsequent purchase resulted from the search) of the search term at column 464E. The column 464F provides an option that if chosen (e.g., if the icon is clicked on) causes the display of a list of suppliers of the product represented by the search term (e.g., "paper") who have sold the product to the buyer community. A search term can be entered at 466 to search for use/occurrences of the term within the respective buyer system and results listed in display 460 such as shown.

In an embodiment, a set of recommended buyer system actions are listed in display 468. Such recommendations can include enabling or disabling a particular supplier system catalog and/or enabling a particular purchasing feature that would, for example, likely result in future cost savings pursuant to buyer system history and/or community intelligence data and analytics such as further described herein. In an embodiment, a recommended Open Buy feature can be enabled at 469, which would enable embedding third-party catalogs directly and combine checkout, approvals, and reporting in an integrated buyer system purchasing interface. In one embodiment, a recommended Source Together can be enabled for sourcing certain items together with other buyer systems. By selecting a button 467A, a task for the respective recommended action is created. By selecting a button 467B, the respective recommended action is performed.

Figure 4D:
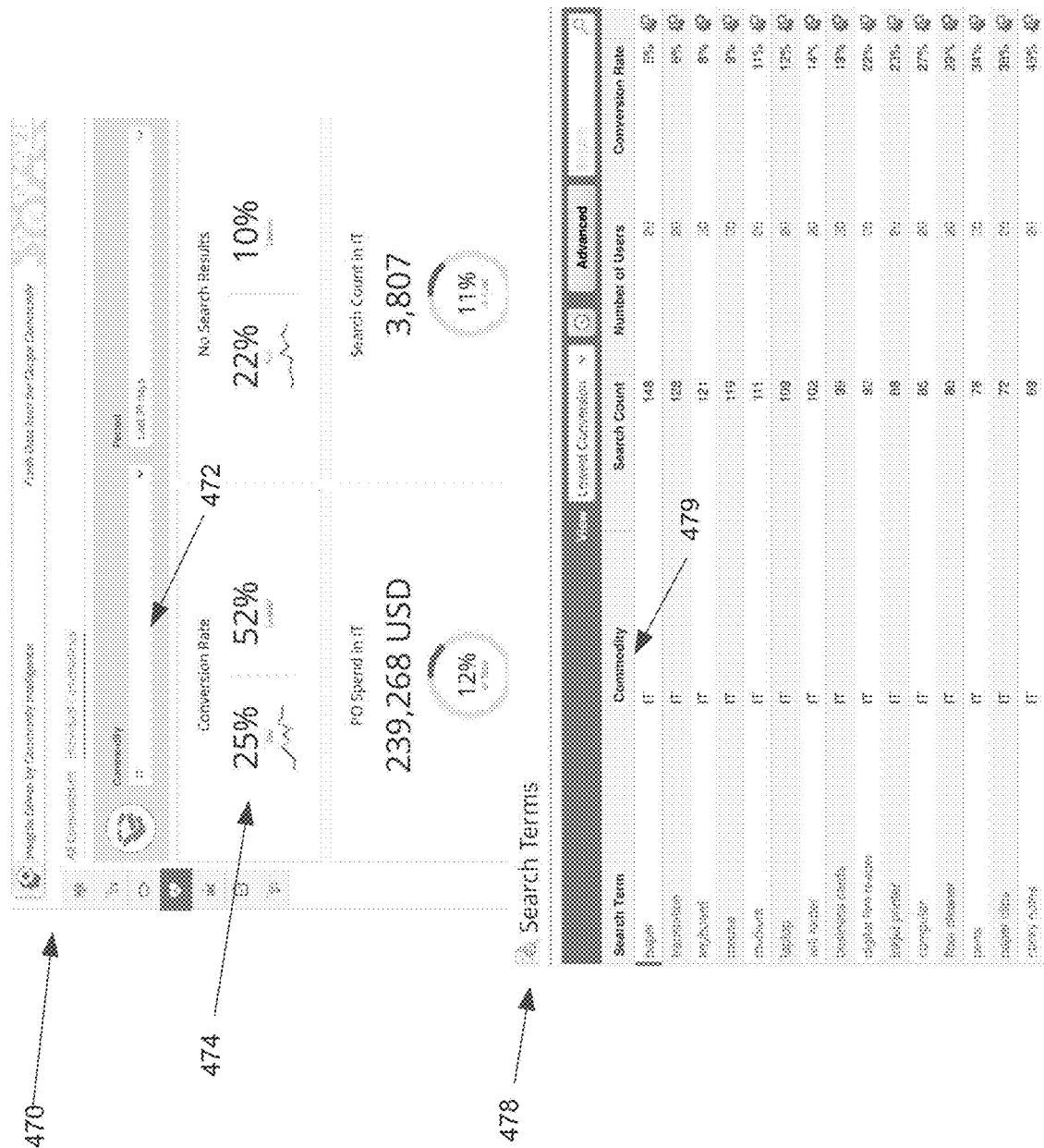
FIG. 4D is an illustrative graphical user interface showing a report of commodity-specific search results and associated statistics related to a buyer system according to various embodiments.

FIG. 4D is an illustrative graphical user interface showing a report of commodity-specific search results and associated statistics related to a buyer system according to various embodiments. In an embodiment, a display 470 shows similar presentation of statistics as shown in FIG. 4B for a particular commodity. A particular commodity (e.g., information technology, laptop computers, office furniture) can be selected from menu 472. The purchase conversion rate resulting from searches for the commodity during a specified period is displayed at 474, including for that of the buyer system and for the highest conversion rate among a community of buyer systems with searches for the category of commodity. Similar to FIG. 4B, statistics relating to searches in which no results are produced, overall purchase spending, and search counts are presented for the particular commodity. Similar to FIG. 4C, a list of utilized search terms and related statistics is displayed at 478 for the particular commodity.

Figure 4E:
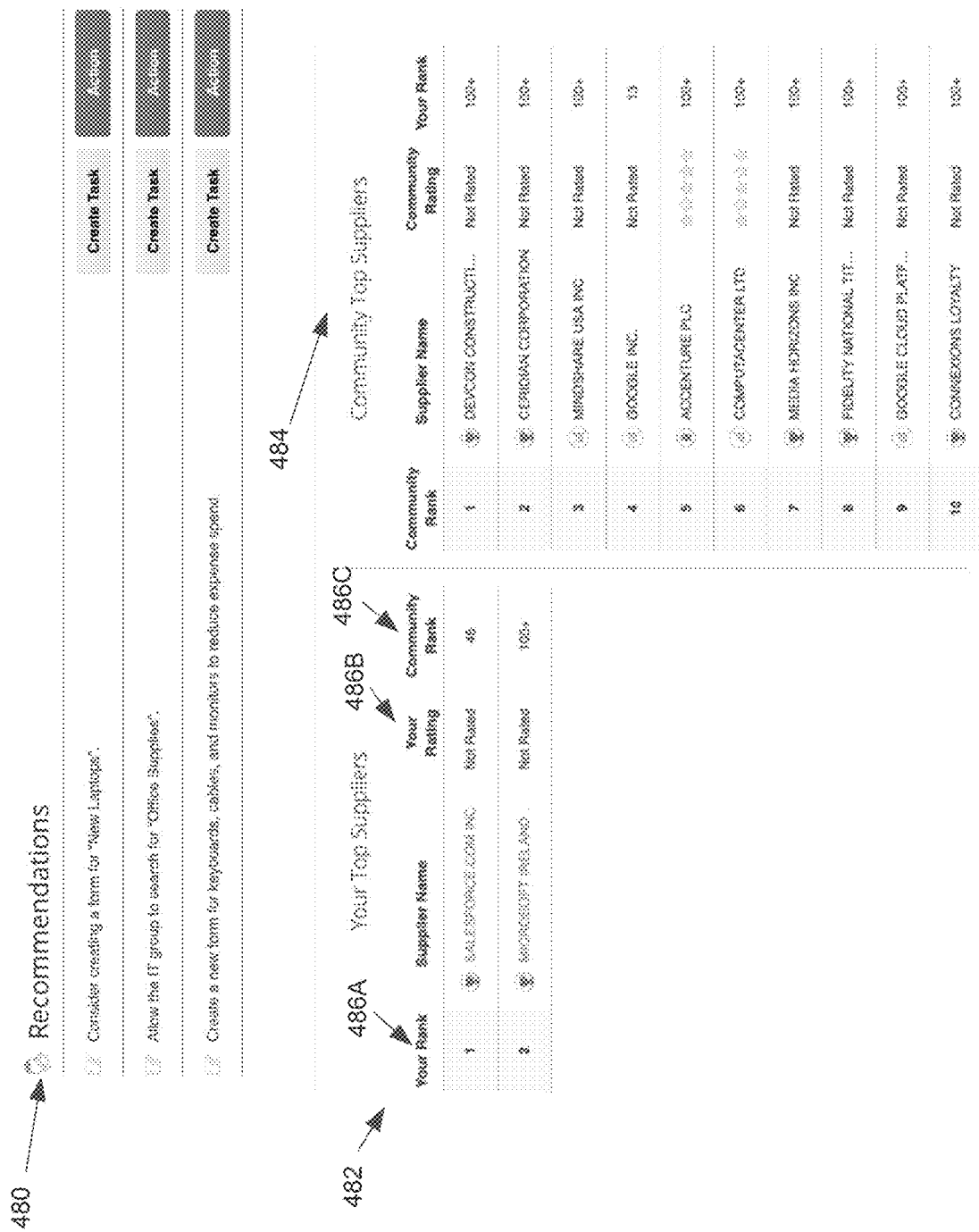
FIG. 4E is an illustrative graphical user interface showing a report of supplier system data related to a buyer system with buyer system recommendations according to various embodiments.

FIG. 4E is an illustrative graphical user interface showing a report of supplier system data related to a buyer system with buyer system recommendations according to various embodiments. Similar to FIG. 4C, recommendations for the respective buyer system and further with respect to a particular commodity are displayed at 480 and can be based upon prior activity and preferences of the buyer system and/or also based upon community intelligence such as further described herein. In one embodiment, a recommended change in access control can be made to allow an authorized user group to now search enabled supplier catalogs for office supplies and possibly request a purchase.

A list of top suppliers for the respective buyer system and a particular commodity is displayed at 482. The list can be ordered by a rank (e.g., based on total purchases by the buyer system) as listed in column 486A and can include additional information such as the historical buyer system rating of the supplier system in column 486B and a comparative ranking of the supplier system within a buyer system community in column 486C. For comparison purposes, a list of top suppliers for the buyer system community and the particular commodity is displayed at 484.

Figure 5:
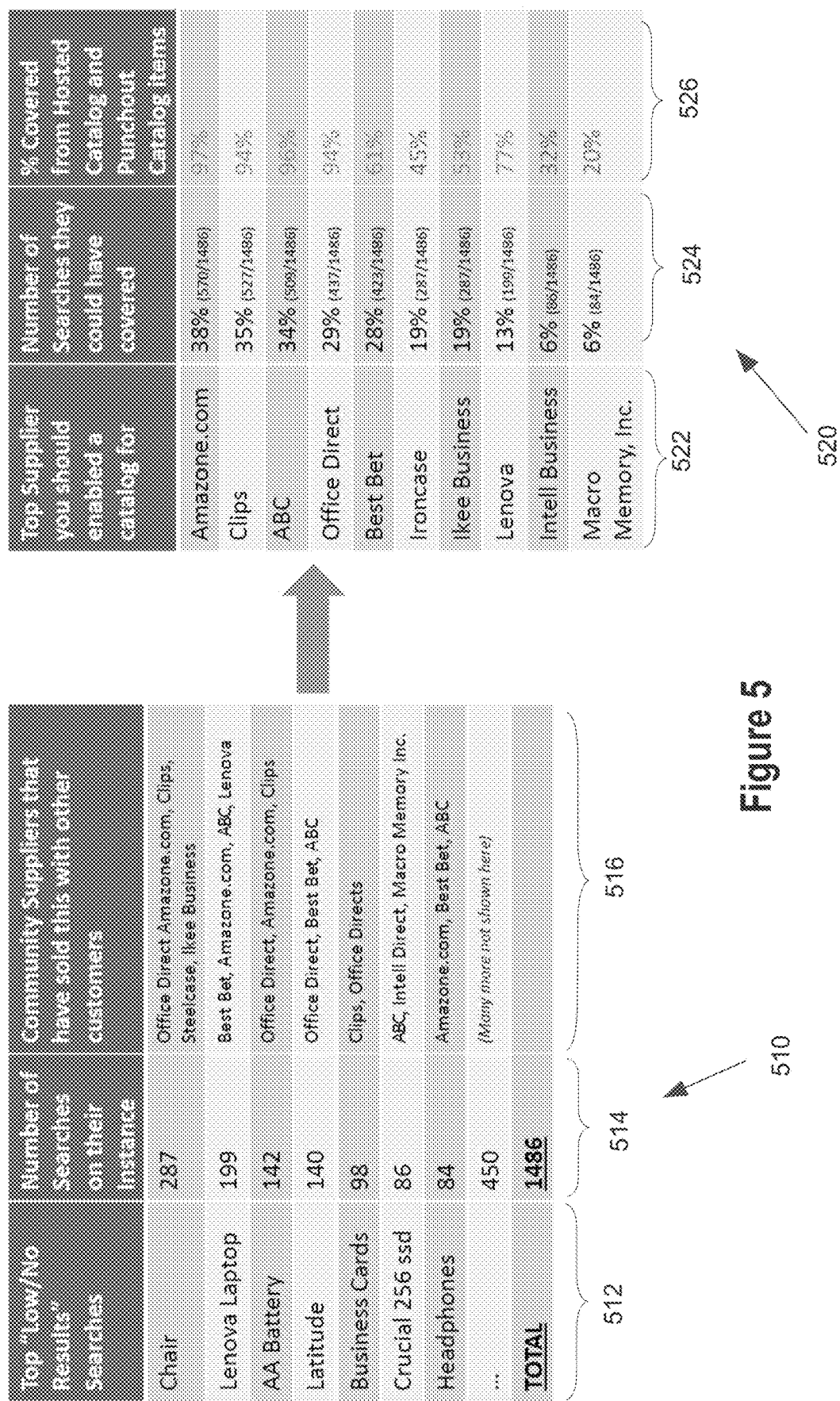
FIG. 5 is an illustrative report of search results and recommended selections of additional search matches based on community data according to various embodiments.

FIG. 5 is another illustrative report of search results and recommended selections of additional search matches based on community data according to various embodiments. In display 510, a list of top low match query expressions made by a particular buyer system is shown at 512 along with the number of searches made during a particular time frame with each low match expression at 514. A list of supplier systems across all buyer systems which have sold products associated with each low match expression is also shown at 516. In display 520, a list of top recommended supplier systems (not presently associated with the particular buyer system) for low match query expressions is shown at 522 along with the percentage (together with actual numbers making up the percentage) of low match query expressions the supplier is matched with at 524. These matches can be based upon both catalog/integrated listings and upon data gathered regarding purchases made outside of enabled or integrated catalogs. For example, the gathered data may include transactions of "free-form" or manual requisitions of items not available from enabled/integrated content. Thus, a supplier can still cover a queried item even though it isn't available through an integrated catalog. In addition, the combined percentage of query expressions from a particular buyer system which are only covered by a particular supplier's E-procurement system catalogs and external (or "punchout") catalogs is shown at 526. The statistics shown in 526 provide a better indication of how search results can be improved by enabling catalogs by specific suppliers.

Figure 6:
FIG. 6 is an illustrative report of low match search results and product categories into which corresponding search query expressions were assigned and could be assigned according to various embodiments.
Figure 6:

FIG. 6 is an illustrative report of low match query results and product categories into which corresponding search query expressions were assigned at display 610 and could be assigned at display 620. Catalog items can be classified into categories or commodity hierarchies of different levels of specificity. An example of a commodity hierarchy is the United Nations Standard Products and Services Code (UNSPSC). A more specific or deeper classification level into the hierarchy can be used to distinguish types of items from each other and lead to more accurate search results when particular search expressions are utilized. For example, "office chairs" can be classified into a category or group identified generally as "chairs" or more specifically as "office chairs." A set of items in catalogs classified as "office chairs" would provide a better match than with all catalog items classified as chairs. In an embodiment, display 610 shows the results of the e-procurement system's classification of a query search term into one of the catalog item categories under UNSPSC. Such a tool can be utilized to configure how queries are processed and to improve the likelihood of matching particular search terms with the appropriate catalogs. In display 620, a list of top level-one recommended categories for which a catalog search can be associated with is shown. An E-procurement server according to embodiments can be configured to match particular catalogs with particular categories of search terms. In an embodiment, based on the recommendations as described above, a buyer system or supplier system user can configure an E-procurement server to match particular query expressions with particular categories of products, resulting in particular query expressions being matched with particular catalogs assigned to those categories. In other embodiments, the E-procurement system can be configured to match particular query expressions with all categories of products but have the search results divided into particular categories of products.

FIG. 7 is an illustrative graphical user interface showing trigger configuration settings for a buyer system for automatic performance of enhanced catalog search and generation of enhanced search reports and/or other system responses according to various embodiments. As described above in reference to FIG. 3, triggers can be enabled so that reports or notifications are generated based upon certain conditions or events that occur such as catalogs being added or removed from an E-procurement database or numbers of un-matched queries exceeding particular thresholds. In an embodiment, triggers are configured at 700 based upon parameters for products being sold to a particular buyer system (e.g., recent spend levels of a particular buyer system). At 702, the expiration of a contract between a buyer system and seller system (e.g., for the enablement/integration of a particular catalog) may trigger an alert of that expiration to a buyer system and/or an enhanced catalog search. In an embodiment, a notification (e.g., popup or separate window) may present alternative supplier system opportunities (e.g., catalogs) to a buyer system user as potential substitutes for the expiring contract.

At 704, a trigger can be set to respond to an invoice increase with respect to particular integrated catalogs and/or supplier systems. At 714, a trigger can respond to an overall increase in spend with respect to a particular catalog or supplier system. In an embodiment, a notification may present alternative supplier system opportunities to a buyer system as potential additions/substitutes to the supplier system in which an invoice or spending has increased. For example, based on analysis performed by the E-procurement system, the buyer system may be able to save significant costs by utilizing the alternative recommended opportunities.

At 708, a trigger can be set to respond to particular levels of increased spending by a buyer system. In an embodiment, a notification to the buyer system can indicate such spending levels exceeded a threshold and can indicate the various levels of spending according to categories or classifications of commodities. The notification may further present the buyer system with opportunities with selected additional supplier system catalogs, including items associated with the identified highest spend level categories. In an embodiment, at 706, a trigger can be enabled to respond to increased spending in particular categories/classifications of items purchased. In an embodiment, at 710, the dollar amount of a single or set number of requisitions exceeding a particular threshold of spend can trigger a notification to a buyer system. In an embodiment, at 712, a frequency of off-contract spending (outside of enabled/integrated catalogs) that exceeds a threshold can trigger a response. For example, a notification can alert the buyer system of such off-contract spending and present the buyer system with supplier system opportunities with which the purchases could have transpired.

At 720, conditions can be set to generate particular types of notifications to buyer systems. For example, at 722, a pro-active notification/report to the buyer system based upon most frequently searched-for items and/or based upon particular types of commodities can be generated in response to particular conditions (e.g., such as the triggers configured at 700). An enhanced catalog search for those particular types of commodities can also be automatically performed. Similarly, at 724, a pro-active notification/report including the supplier systems which cover the most searches by the buyer systems in the buyer community can be configured and generated in response to particular conditions. Examples of pro-active notifications such as based upon triggers configured in connection with 722 and 724 are illustrated at 930 of FIG. 9 as further described below. In embodiments, pro-active notifications can also be activated in the form of interactive pop-up windows identifying new opportunities related to the most frequently searched-for items and/or particular types of commodities.

In various embodiments, triggers are configured at 730 which can be enabled based upon a supplier system action. For example, at 732, a notification/report can be generated for the buyer system in response to a supplier system recommending a catalog for a particular buyer system (such as based on historical data gathered by the E-procurement system). At 734, a notification/report can be configured for pro-active transmission to the buyer system when information in the E-procurement system relating to a particular supplier system has become outdated (e.g., a catalog does not contain an updated list of items) or, at 736, configured for when a supplier system becomes inactive. As described above, such a report/notification can include recommended alternative supplier system opportunities that relate to the notification.

In various embodiments, triggers are configured at 740 which are enabled based upon historical tracking of particular suppliers. At 742, a trigger can be based upon risks identified with a particular seller system in providing an item from one of its catalogs. For example, in an embodiment, the E-procurement system can track the past fulfillment of commodities purchased from a supplier system and determine if an excessive number of items were damaged, returned, and/or never delivered. An enhanced catalog search of catalogs offered by supplier systems in the same industry or offering the same types of products as the particular high-risk supplier system can also be automatically performed. At 744, a supplier system's performance relative to other seller systems can trigger a response (e.g., based upon a supplier's performance falling below a minimum threshold such as based upon the reviews of other buyer systems and/or other metrics associated with seller system performance).

In embodiments, the above described triggers can be configured for automatically enabling/integrating/associating or de-enabling particular catalogs or suppliers with particular buyer systems. Such a trigger may further alert a buyer system and require feedback from the buyer system so that any automatic enabling/disabling or associating could be modified or canceled if desired.

In embodiments, selecting one of the trigger mechanisms can generate a further interface for setting particular trigger conditions more precisely (e.g., selecting specific thresholds, specific suppliers and/or catalogs). For example, FIG. 8 is an illustrative graphical user interface for configuring specific triggers for automatic notifications of seller system recommendations according to various embodiments. At drop-down menu 800, a type of a new trigger to be enabled can be selected in a drop-down menu of different available types of triggers (e.g., including the types further described herein). For example, a trigger can be configured to notify a buyer system of new supplier opportunities when certain conditions occur. In an embodiment, a threshold at input field 820 can be specified for when the notification is generated, such as when a supplier system monitored through the E-procurement system provides catalogs that match with searches by the buyer system at a level that exceeds the specified threshold. At input field 830, a period of search history can be set for analyzing and comparing buyer system searches with currently available supplier system opportunities. At drop-down menu 840, a classification of commodity can be selected for considering invoices that trigger enhanced catalog searches. In embodiments, different levels of specificity in the hierarchy of classifications can be selected from a drop-down menu. (e.g., "chairs," "office chairs," etc.). A note field 850 provides information about how the particular trigger operates.

Figure 9:
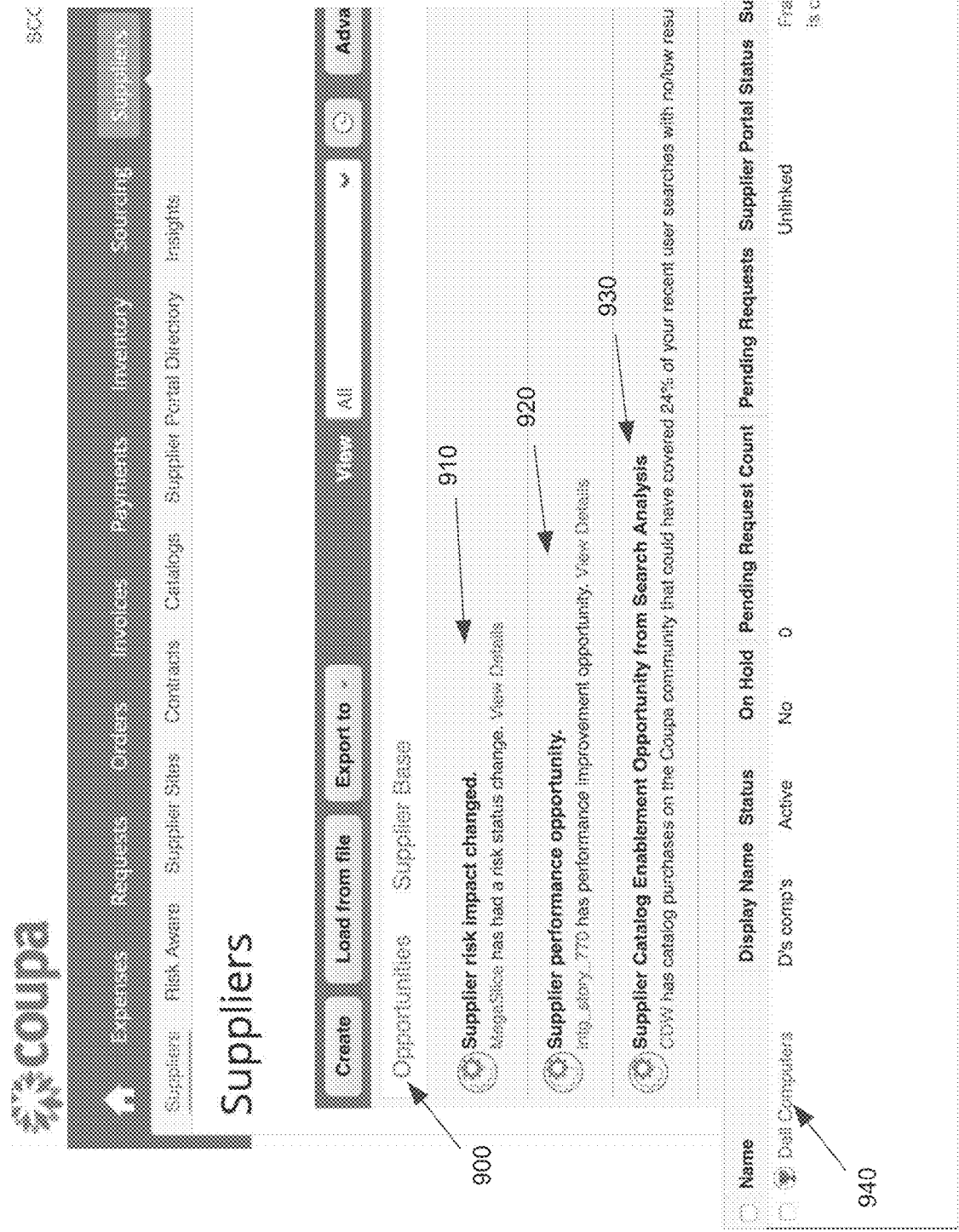
FIG. 9 is an illustrative graphical user interface showing a status report of catalog suppliers based upon search and supplier event analytics according to various embodiments.

FIG. 9 is an illustrative graphical user interface for a buyer system showing a status report of catalog suppliers based upon search and supplier event analytics according to various embodiments. In an embodiment, such a report can be automatically triggered such as described above in response to a particular analytic satisfying a particular condition. In various embodiments, the report can be generated in an interface for enabling supplier opportunities or disabling presently enabled/integrated supplier systems or catalogs. At 900, a buyer system user can select to view the status of recommended supplier system opportunities. At 910, the risk status (e.g., such as described above) of a supplier system opportunity is listed. A buyer system user can select the listed item to view further details about the supplier system status such as shown in a pop-up window at 940. For example, if a risk level associated with a particular supplier has changed (e.g., the supplier's feedback rating from the buyer community has dropped below a particular threshold), a generated report can indicate the change and allow a buyer system to take further action if desired (e.g., disable or disassociate a particular supplier/catalog in relation to the buyer system).

At 920, a supplier system opportunity is listed in which the E-procurement system observed an increased performance of a supplier system that is not currently enabled for or associated with the buyer system. At 930, a supplier system opportunity was identified by the E-procurement system in which a supplier system that is not currently enabled for or associated with the buyer system provided items that match with a particular proportion of the overall buyer system purchases.

Example Hardware Components

According various embodiments, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 10:
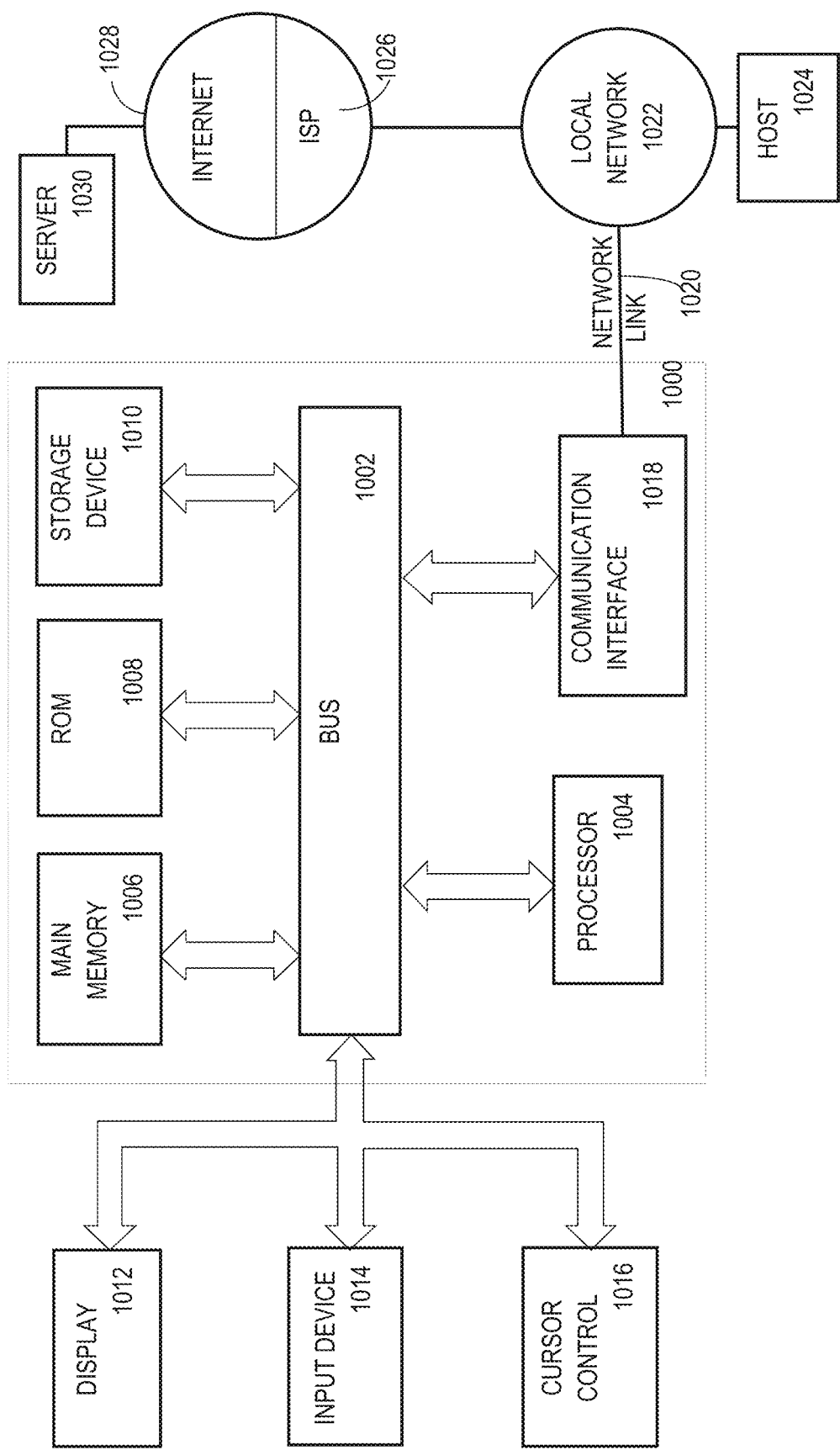
FIG. 10 is a block diagram that illustrates an example computer system with which an embodiment may be implemented.

FIG. 10 is a block diagram that illustrates an example computer system with which an embodiment may be implemented. In the example of FIG. 10, a computer system 1000 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 1000 includes an input/output (I/O) subsystem 1002 which may include a bus and/or other communication mechanism(s) for communicating information and/or instructions between the components of the computer system 1000 over electronic signal paths. The I/O subsystem 1002 may include an I/O controller, a memory controller and at least one I/O port. The electronic signal paths are represented schematically in the drawings, for example as lines, unidirectional arrows, or bidirectional arrows.

At least one hardware processor 1004 is coupled to I/O subsystem 1002 for processing information and instructions. Hardware processor 1004 may include, for example, a general-purpose microprocessor or microcontroller and/or a special-purpose microprocessor such as an embedded system or a graphics processing unit (GPU) or a digital signal processor or ARM processor. Processor 1004 may comprise an integrated arithmetic logic unit (ALU) or may be coupled to a separate ALU.

Computer system 1000 includes one or more units of memory 1006, such as a main memory, which is coupled to I/O subsystem 1002 for electronically digitally storing data and instructions to be executed by processor 1004. Memory 1006 may include volatile memory such as various forms of random-access memory (RAM) or other dynamic storage device. Memory 1006 also may be used for storing temporary variables or other intermediate information during execution of instructions to be executed by processor 1004. Such instructions, when stored in non-transitory computer-readable storage media accessible to processor 1004, can render computer system 1000 into a special-purpose machine that is customized to perform the operations specified in the instructions.

Computer system 1000 further includes non-volatile memory such as read only memory (ROM) 1008 or other static storage device coupled to I/O subsystem 1002 for storing information and instructions for processor 1004. The ROM 1008 may include various forms of programmable ROM (PROM) such as erasable PROM (EPROM) or electrically erasable PROM (EEPROM). A unit of persistent storage 1010 may include various forms of non-volatile RAM (NVRAM), such as FLASH memory, or solid-state storage, magnetic disk or optical disk such as CD-ROM or DVD-ROM, and may be coupled to I/O subsystem 1002 for storing information and instructions. Storage 1010 is an example of a non-transitory computer-readable medium that may be used to store instructions and data which when executed by the processor 1004 cause performing computer-implemented methods to execute the techniques herein.

The instructions in memory 1006, ROM 1008 or storage 1010 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file processing instructions to interpret and render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 1000 may be coupled via I/O subsystem 1002 to at least one output device 1012. In one embodiment, output device 1012 is a digital computer display. Examples of a display that may be used in various embodiments include a touch screen display or a light-emitting diode (LED) display or a liquid crystal display (LCD) or an e-paper display. Computer system 1000 may include other type(s) of output devices 1012, alternatively or in addition to a display device. Examples of other output devices 1012 include printers, ticket printers, plotters, projectors, sound cards or video cards, speakers, buzzers or piezoelectric devices or other audible devices, lamps or LED or LCD indicators, haptic devices, actuators or servos.

At least one input device 1014 is coupled to I/O subsystem 1002 for communicating signals, data, command selections or gestures to processor 1004. Examples of input devices 1014 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 1016, which may perform cursor control or other automated control functions such as navigation in a graphical interface on a display screen, alternatively or in addition to input functions. Control device 1016 may be a touchpad, a mouse, a trackball, or cursor direction keys for communicating direction information and command selections to processor 1004 and for controlling cursor movement on display 1012. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 1014 may include a combination of multiple different input devices, such as a video camera and a depth sensor.

In another embodiment, computer system 1000 may comprise an internet of things (IoT) device in which one or more of the output device 1012, input device 1014, and control device 1016 are omitted. Or, in such an embodiment, the input device 1014 may comprise one or more cameras, motion detectors, thermometers, microphones, seismic detectors, other sensors or detectors, measurement devices or encoders and the output device 1012 may comprise a special-purpose display such as a single-line LED or LCD display, one or more indicators, a display panel, a meter, a valve, a solenoid, an actuator or a servo.

When computer system 1000 is a mobile computing device, input device 1014 may comprise a global positioning system (GPS) receiver coupled to a GPS module that is capable of triangulating to a plurality of GPS satellites, determining and generating geo-location or position data such as latitude-longitude values for a geophysical location of the computer system 1000. Output device 1012 may include hardware, software, firmware and interfaces for generating position reporting packets, notifications, pulse or heartbeat signals, or other recurring data transmissions that specify a position of the computer system 1000, alone or in combination with other application-specific data, directed toward host 1024 or server 1030.

Computer system 1000 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 1000 in response to processor 1004 executing at least one sequence of at least one instruction contained in main memory 1006. Such instructions may be read into main memory 1006 from another storage medium, such as storage 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 1010. Volatile media includes dynamic memory, such as memory 1006. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 1002. Transmission media can also take the form of acoustic or light waves, such as those generated during radio-wave and infra-red data communications.

Various forms of media may be involved in carrying at least one sequence of at least one instruction to processor 1004 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 1000 can receive the data on the communication link and convert the data to be read by computer system 1000. For instance, a receiver such as a radio frequency antenna or an infrared detector can receive the data carried in a wireless or optical signal and appropriate circuitry can provide the data to I/O subsystem 1002 such as place the data on a bus. I/O subsystem 1002 carries the data to memory 1006, from which processor 1004 retrieves and executes the instructions. The instructions received by memory 1006 may optionally be stored on storage 1010 either before or after execution by processor 1004.

Computer system 1000 also includes a communication interface 1018 coupled to bus 1002. Communication interface 1018 provides a two-way data communication coupling to network link(s) 1020 that are directly or indirectly connected to at least one communication networks, such as a network 1022 or a public or private cloud on the Internet. For example, communication interface 1018 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 1022 broadly represents a local area network (LAN), wide-area network (WAN), campus network, internetwork or any combination thereof. Communication interface 1018 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 1018 sends and receives electrical, electromagnetic or optical signals over signal paths that carry digital data streams representing various types of information.

Network link 1020 typically provides electrical, electromagnetic, or optical data communication directly or through at least one network to other data devices, using, for example, satellite, cellular, Wi-Fi, or BLUETOOTH technology. For example, network link 1020 may provide a connection through a network 1022 to a host computer 1024.

Furthermore, network link 1020 may provide a connection through network 1022 or to other computing devices via internetworking devices and/or computers that are operated by an Internet Service Provider (ISP) 1026. ISP 1026 provides data communication services through a world-wide packet data communication network represented as internet 1028. A server computer 1030 may be coupled to internet 1028. Server 1030 broadly represents any computer, data center, virtual machine or virtual computing instance with or without a hypervisor, or computer executing a containerized program system such as DOCKER or KUBERNETES. Server 1030 may represent an electronic digital service that is implemented using more than one computer or instance and that is accessed and used by transmitting web services requests, uniform resource locator (URL) strings with parameters in HTTP payloads, API calls, app services calls, or other service calls. Computer system 1000 and server 1030 may form elements of a distributed computing system that includes other computers, a processing cluster, server farm or other organization of computers that cooperate to perform tasks or execute applications or services. Server 1030 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 1030 may comprise a web application server that hosts a presentation layer, application layer and data storage layer such as a relational database system using structured query language (SQL) or no SQL, an object store, a graph database, a flat file system or other data storage.

Computer system 1000 can send messages and receive data and instructions, including program code, through the network(s), network link 1020 and communication interface 1018. In the Internet example, a server 1030 might transmit a requested code for an application program through Internet 1028, ISP 1026, local network 1022 and communication interface 1018. The received code may be executed by processor 1004 as it is received, and/or stored in storage 1010, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 1004. While each processor 1004 or core of the processor executes a single task at a time, computer system 1000 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

Extensions and Alternatives

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction

What is claimed is:

1. A computer-implemented method comprising:
maintaining, by a processor, a database comprising a plurality of records of one or more supplier system catalogs that have been enabled by a plurality of buyer systems;
tracking, by the processor, a plurality of query expressions and corresponding query results generated from the database by a specific buyer system of the plurality of buyer systems, the query results identifying matches between the query expressions and a set of records of supplier system catalogs of the one or more supplier system catalogs that have been enabled and integrated for procurement with the specific buyer system;
determining, from the plurality of query expressions and corresponding query results, the query expressions that satisfy particular criteria for low match rates;
identifying additional matches between the query expressions and at least one unassociated supplier system catalog outside of the set of enabled and integrated supplier system catalogs, the at least one unassociated supplier system catalog being enabled and integrated for procurement with at least one buyer system of the plurality of buyer systems other than the specific buyer system, the identifying being based upon an analysis of community buyer system data tracked with respect to the at least one unassociated supplier system catalog, and including ranking at least one supplier catalog of the at least one unassociated supplier system catalog based on the community buyer system data;
the analysis of community buyer system data comprising at least one of: identifying additional matches with supplier system catalogs of unassociated supplier systems that exceed a certain performance metric with respect to the plurality of buyer systems; identifying the additional matches with catalogs of unassociated supplier systems that do not exceed a certain risk metric with respect to the plurality of buyer systems; and identifying additional matches with supplier system catalogs of unassociated supplier systems that exceed a certain threshold of positive community rating among the plurality of buyer systems and that have completed a minimum number of transactions with the plurality of buyer systems;
generating a report based upon the additional matches and transmitting, across a computer network, the report to the specific buyer system.

2. The method of claim 1, further comprising determining the query expressions that satisfy particular criteria for low match rates and generating and transmitting the report automatically, in response to one or more triggers comprising particular trigger criteria.

3. The method of claim 2, the particular trigger criteria comprising particular changes to the database, including at least one of: the addition of a new catalog matching the query expressions with low match rates; the dissociation of a supplier system catalog with the specific buyer system which matched the tracked query expressions at a rate exceeding a particular threshold; and an increase in the occurrence of unmatched query expressions that exceed a particular threshold.

4. The method of claim 2, the particular trigger criteria comprising specific buyer system events including at least one of: the expiration of enablement and integration of a supplier system catalog with the specific buyer system; an increase of specific buyer system spending that exceeds a particular threshold; and an increase of specific buyer system spending outside of the set of supplier system catalogs of the one or more supplier catalogs enabled and integrated for procurement with the specific buyer system that exceeds a particular threshold.

5. The method of claim 2, further comprising, in response to the one or more triggers, automatically enabling and integrating additional supplier system catalogs for procurement use with the specific buyer system based upon the additional matches.

6. The method of claim 5, further comprising, in response to the automatic enabling and integrating, sending an alert to the specific buyer system to allow the automatic enabling and integrating to be modified or canceled.

7. The method of claim 1, the particular criteria for low match rates comprising a count of matches for a query expression that is below a certain threshold and a minimum number of occurrences of the query expression among the tracked plurality of query expressions.

8. The method of claim 1, the generating of the report further comprising: compiling and presenting details about a supplier that is associated with the at least one supplier catalog of the at least one unassociated supplier system catalog, including one or more of: a financial score based on size and spend levels; a judicial score based on buyer feedback; news sentiment including percentage of news items with positive analysis, the news items being stored in the database; screening status associated with the supplier, items associated with the screening status being stored in the database; overall risk rating; enablement and integration features comprising technology that is supported by a system of the supplier; and number and list of countries the supplier ships to.

9. The method of claim 8, further comprising displaying automatic updates to the details on the specific buyer system.

10. The method of claim 1, the generating of the report further comprising ranking search results based on at least one of better product reviews and more frequent product purchases.

11. The method of claim 1, the generating of the report further comprising generating statistics about low match query expressions and recommendations and including them in the report.

12. The method of claim 1, the generating of the report further comprising adding analytical information pertinent for at least one of determining productivity of the buyer system in fulfilling search and purchase requests and improving performance.

13. One or more non-transitory computer-readable media storing one or more sequences of executable instructions which, when executed by one or more processors, cause:
    maintaining, by a processor, a database comprising a plurality of records of one or more supplier system catalogs enabled by a plurality of buyer systems;
    tracking, by the processor, a plurality of query expressions and corresponding query results generated from the database by a specific buyer system of the plurality of buyer systems, the query results identifying matches between the query expressions and a set of records of supplier catalogs of the one or more supplier system catalogs enabled and integrated for procurement with the specific buyer system;
    determining, from the plurality of query expressions and corresponding query results, the query expressions that satisfy particular criteria for low match rates;
    identifying additional matches between the query expressions and at least one unassociated supplier system catalog outside of the set of enabled and integrated supplier system catalogs, the at least one unassociated supplier system catalog being enabled and integrated for procurement with at least one buyer system of the plurality of buyer systems other than the specific buyer system;
    the identifying being based upon an analysis of community buyer system data tracked with respect to the at least one unassociated supplier system catalog, and including ranking at least one supplier catalog of the at least one unassociated supplier system catalog based on the community buyer system data;
    the analysis of community buyer system data comprising at least one of: identifying additional matches with catalogs of unassociated supplier systems that exceed a certain performance metric with respect to the plurality of buyer systems, identifying the additional matches with catalogs of unassociated supplier systems that do not exceed a certain risk metric with respect to the plurality of buyer systems; and identifying additional matches with supplier system catalogs of unassociated supplier systems that exceed a certain threshold of positive community rating among the plurality of buyer systems and that have completed a minimum number of transactions with the plurality of buyer systems;
    generating a report based upon the additional matches and transmitting, across a computer network, the report to the specific buyer system.

14. The computer readable media of claim 13, further comprising sequences of executable instructions which, when executed by the one or more processors, cause executing: determining the query expressions that satisfy particular criteria for low match rates and generating and transmitting the report is performed automatically in response to one or more triggers comprising particular trigger criteria.

15. The computer readable media of claim 13, the particular trigger criteria comprising particular changes to the database, including at least one of: the addition of a new catalog matching the query expressions with low match rates; the removal of a catalog which matched the tracked query expressions at a rate exceeding a particular threshold; and an increase in the occurrence of unmatched query expressions that exceed a particular threshold.

16. The computer readable media of claim 13, the particular trigger criteria comprising specific buyer system events, including at least one of: the expiration of enablement and integration of a supplier catalog with the specific buyer system; an increase of specific buyer system spending that exceeds a particular threshold; and an increase of specific buyer system spending outside of the set of supplier catalogs of the one or more supplier system catalogs enabled and integrated for procurement with the specific buyer system that exceeds a particular threshold.

17. The computer readable media of claim 13 further comprising sequences of instructions which, when executed by the one or more processors, cause executing:
    in response to the one or more triggers, automatically enabling and integrating additional supplier system catalogs for procurement use with the specific buyer system based upon the additional matches.

18. The computer readable media of claim 13, the particular criteria for low match rates comprising a count of matches for a query expression that is below a certain threshold and a minimum number of occurrences of the query expression among the tracked plurality of query expressions.

19. The computer readable media of claim 13, the generating of the report further comprising generating statistics about low match query expressions and recommendations and including them in the report.

20. A computer-implemented method comprising:
    maintaining, by a processor, a database comprising a plurality of records of the one or more supplier catalogs that have been enabled by a plurality of buyer systems;
    tracking, by the processor, a plurality of query expressions and corresponding query results generated from the database by a specific buyer system of the plurality of buyer systems, the query results identifying matches between the query expressions and records of a set of supplier system catalogs of the one or more supplier system catalogs enabled and integrated for procurement by the specific buyer system;
    in response to one or more triggers comprising particular trigger criteria, automatically determining additional matches between at least one query expression of the plurality of query expressions and a set of one or more additional supplier system catalogs outside of the one or more supplier system catalogs enabled and integrated for procurement with the specific buyer system, the at least one unassociated supplier system catalog being enabled and integrated for procurement with at least one buyer system of the plurality of buyer systems other than the specific buyer system;

the trigger criteria comprising particular changes to the database including at least one of: the addition of a new supplier system catalog matching the query expressions with low match rates; the dissociation of an integrated supplier system catalog with the specific buyer system which matched the tracked query expressions at a rate exceeding a particular threshold; and an increase in the occurrence of unmatched query expressions that exceed a particular threshold; and specific buyer system events including at least one of: the expiration of enablement and integration of a supplier system catalog with the specific buyer system; an increase of specific buyer system spending that exceeds a particular threshold; and an increase of specific buyer system spending outside of the set of supplier system catalogs of the one or more supplier catalogs enabled and integrated for procurement with the specific buyer system that exceeds a particular threshold;

the determining being based upon an analysis of community buyer system data tracked with respect to the at least one unassociated supplier system catalog, and including ranking at least one supplier catalog of the at least one unassociated supplier system catalog based on the community buyer system data;

the analysis of community buyer system data comprising at least one of: identifying additional matches with supplier system catalogs of unassociated supplier systems that exceed a certain performance metric with respect to the plurality of buyer systems; identifying the additional matches with catalogs of unassociated supplier systems that do not exceed a certain risk metric with respect to the plurality of buyer systems; and identifying additional matches with supplier system catalogs of unassociated supplier systems that exceed a certain threshold of positive community rating among the plurality of buyer systems and that have completed a minimum number of transactions with the plurality of buyer systems; and generating a report based upon the additional matches and transmitting, across a computer network, the report to the specific buyer system.

* * * * *